No. 862,905. PATENTED AUG. 13, 1907.
F. HART.
PNEUMATIC DRILL.
APPLICATION FILED SEPT. 26, 1902. RENEWED JAN. 6, 1906.

Witnesses:

Inventor:
Frederick Hart,
By Thomas F. Sheridan
Atty

No. 862,905. PATENTED AUG. 13, 1907.
F. HART.
PNEUMATIC DRILL.
APPLICATION FILED SEPT. 26, 1902. RENEWED JAN. 6, 1906.

Witnesses:
Chas. L. Gaylord,
John Enders Jr.

Inventor:
Frederick Hart,
By Thomas F. Sheridan,
Atty.

No. 862,905.  PATENTED AUG. 13, 1907.
F. HART.
PNEUMATIC DRILL.
APPLICATION FILED SEPT. 26, 1902. RENEWED JAN. 6, 1906.

Witnesses:
Inventor:
Frederich Hart,
By Thomas F. Sheridan,
Atty

No. 862,905. PATENTED AUG. 13, 1907.
F. HART.
PNEUMATIC DRILL.
APPLICATION FILED SEPT. 26, 1902. RENEWED JAN. 6, 1906.

PATENTED AUG. 13, 1907.

F. HART.
PNEUMATIC DRILL.
APPLICATION FILED SEPT. 26, 1902. RENEWED JAN. 6, 1906.

Witnesses:

Inventor:
Frederick Hart,
By Thomas F. Sheridan,
Atty.

No. 862,905. PATENTED AUG. 13, 1907.
F. HART.
PNEUMATIC DRILL.
APPLICATION FILED SEPT. 26, 1902. RENEWED JAN. 6, 1906.

Witnesses:
Inventor:
Frederick Hart,
By Thomas F. Sheridan,
Atty.

No. 862,905. PATENTED AUG. 13, 1907.
F. HART.
PNEUMATIC DRILL.
APPLICATION FILED SEPT. 26, 1902. RENEWED JAN. 6, 1906.

Witnesses:
Inventor:
Frederick Hart,
By Thomas F. Sheridan,
Atty.

THE NORRIS PETERS CO., WASHINGTON, D. C.

UNITED STATES PATENT OFFICE.

FREDERICK HART, OF POUGHKEEPSIE, NEW YORK, ASSIGNOR TO LOUIS DENNISON SWEET, TRUSTEE, OF DENVER, COLORADO.

PNEUMATIC DRILL.

No. 862,905.  Specification of Letters Patent.  Patented Aug. 13, 1907.

Application filed September 26, 1902, Serial No. 124,942. Renewed January 6, 1906. Serial No. 294,826.

To all whom it may concern:

Be it known that I, FREDERICK HART, a subject of the King of Great Britain, residing at Poughkeepsie, in the county of Duchess and State of New York, have invented certain new and useful Improvements in Pneumatic Drills, of which the following is a specification. This invention relates to that class of drills which is used for the purpose of drilling or boring in rock and ores, and has particular relation to the construction and arrangement of the parts which form the drill, as will more fully hereinafter appear.

The principal object of the invention is to provide a simple, economical and efficient pneumatic ore and stone-drilling machine.

A further object of the invention is to provide an ore and stone drill with percussion and rotary mechanism. Further objects of the invention will appear from an examination of the drawings and the following description and claims.

The invention consists principally in a pneumatic drill, in which there are combined a rotatable hammer cylinder provided with an axial opening in the front end to receive the shank of a drill or similar tool, a percussion hammer therein, a fluid pressure engine to the rear thereof and arranged substantially in line with the hammer cylinder, and gear mechanism interposed between the multiple cylinder fluid pressure engine and hammer cylinder to transmit power and motion from the engine to the hammer cylinder.

The invention consists further in a pneumatic drill in which there are combined a supporting frame portion, a hammer cylinder rotatably mounted therein and provided with a projecting forward end to receive the shank of a drill or similar tool, a percussion hammer therein, a multiple cylinder fluid pressure engine arranged at the rear of and substantially in line with the hammer cylinder, a gear on the hammer cylinder, a second gear non-rotatably fixed to the frame of the machine, and an intermediate gear driven by the engine to transmit power and motion from such engine to the hammer cylinder.

The invention consists further, and finally, in the features, combinations and details of construction hereinafter described and claimed.

In the accompanying drawings

In the art to which this invention relates, it is well known that in the drilling of rock or ore it is desirable to have a drill which is provided with mechanism to give the drill a large number of blows in succession—in other words, to have a percussion hammer which will tap the drill and drive it into the rock or ore. At the same time it is desirable to have some mechanism by which the drill is turned while the percussion hammer is in operation, thereby facilitating the breaking up of the rock and ore in the hole in which the drill is working.

Figure 1:
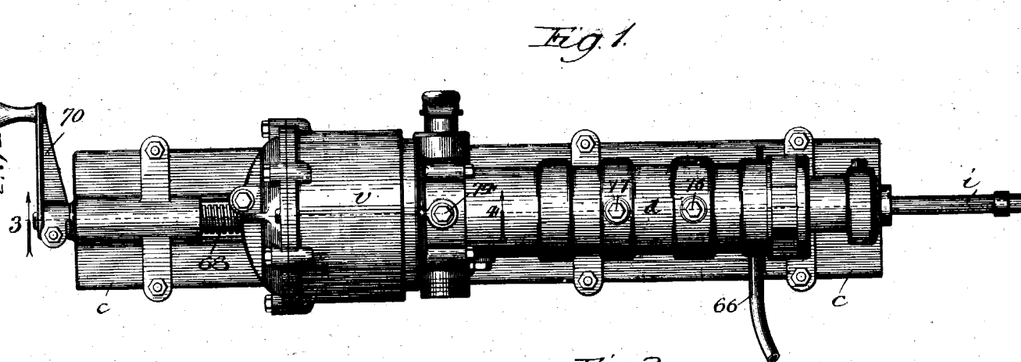
—Figure 1 is a plan view of a rock and ore-boring drill constructed in accordance with these improvements.
Figure 2:
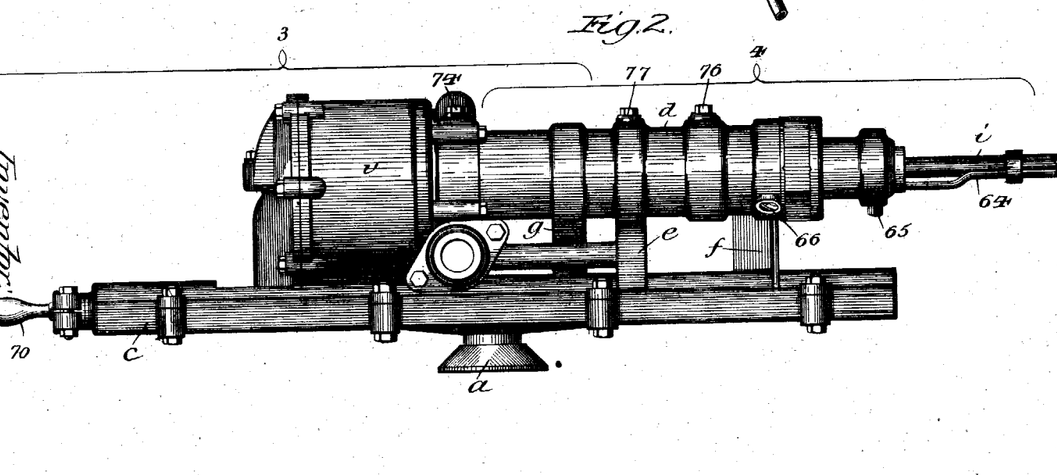
Fig. 2 a side elevation of the same.

Describing first the means by which the drill is held in position for use, a swiveling base $a$, having a slide $b$ fixed thereto, is provided. Slidingly mounted upon the slide of this swiveling base is a supporting frame, comprising a saddle portion $c$, a tubular portion forming the hammer cylinder, and a casing $v$, in the chamber $u$ of which the engine cylinders are mounted. The saddle portion supports the tubular portion $d$, by means of a plurality of pillars *e*, *f* and *g*,—as shown in Fig. 2—and also supports the casing *v*, all being slidable with the saddle portion. In the tubular portion is rotatably mounted a hammer cylinder *h*, the front end of which is provided with an axial opening adapted to receive the shank *i* of a drill or similar tool. This drill shank projects a small distance into the hammer chamber of the cylinder, so that a percussion hammer *j* may strike the same a large number of blows in rapid succession and drive its cutting end into the rock or ore.

To operate or reciprocate the percussion hammer, the hammer cylinder is provided with a bore, or what might be termed a stepped hammer chamber *l*—that is, a bore having a portion *k* of small diameter, in which the front or reduced portion of the hammer works or moves, and a bore or chamber portion *l'* having a large diameter, in which the head of the hammer operates. Examining Fig. 4, it will be seen that the head of the hammer forms a shoulder *m*, which, when it is in a position slightly to the right of that shown in the figure, is in position to form an annular chamber *n* in which the fluid pressure operates to move it backwards. When in the position shown in Fig. 4, the fluid pressure flows through a plurality of by-passes *o* to the rear of the cylinder, where it enters the stepped chamber *l* in the rear end of the hammer cylinder, forcing the piston hammer forward to contact the drill shank. When the rear end of the piston hammer passes to the right of a line 8—see Fig. 4—it opens up a plurality of exhaust passages *q* so as to exhaust the fluid pressure, or the major portion of it, into a passage *r* which leads to the base of the frame portion. The fluid pressure, which acts on the superior area at the rear of the hammer cylinder and piston hammer, being exhausted, the constant pressure in the annular pressure chamber *n* forces the piston hammer backwards. If such means are not provided, the piston hammer, during its rapid reciprocations, will contact the rear end wall of the hammer cylinder, thereby jarring the same and making an objectionable and dangerous feature in the machine. Extending inwardly from the cap *s*, in such position as to engage the smaller bore in the rear end of the piston hammer as it approaches its rear limit of motion, is a plunger *t*. This plunger engages, as above suggested, the smaller diameter of the bore in the rear of the piston hammer as it approaches its rear limit of motion, so as to compress the air therein and offer a cushioning resistance to the further movement of the piston hammer towards the rear, thereby checking such movement in a gradual manner and minimizing any shock or jar in the machine.

To furnish fluid under pressure to the hammer cylinder to reciprocate the hammer, such cylinder is provided with a multiplicity of inlet openings 53 registering at all times—when the main throttle valve hereinafter described is opened—with a passage 54 in the pillar *e* of the machine, and which also extends around through the pillar portion of the supporting frame in which the hammer cylinder is rotatably mounted. This passage 54 is continued longitudinally along the frame of the machine to the throttle valve hereinafter described.

As before stated, it becomes necessary and desirable to provide means for rotating the hammer cylinder with its drill. To accomplish this a fluid pressure engine is provided and rotatably mounted in a chamber *u* formed by a casing *v* at the rear of the supporting frame. fluid pressure engine is mounted, as stated, at the of the hammer cylinder and eccentric therewith, is composed of two tubular cylinders *w* and *x* arrange when considering their relation in the drawings— different vertical planes and preferably at right an to each other. One end of the engine cylinder m ber is provided with a bearing journaled upon a p tion *y*, which is fixed to the frame or casing of the chine, and the other side of the engine cylinder m ber is provided with a valve face portion *z* having axial opening therein and journaled upon a bea 26, which extends inwardly from a cap 27 which cl the engine chamber. A double crank shaft 28 is vided with one journal rotatably mounted in the fi partition *y* and the other in the bearing portion of cap 27, independently of the engine cylinder and centric to the axis thereof. Each end of both tub cylinders is closed by means of threaded heads 29, each cylinder is provided with two single-acting tons 30 and 31, secured together by means of the sc 32 at or near a point where they form bearings for cranks 33 on the engine crank shaft.

Figure 3:
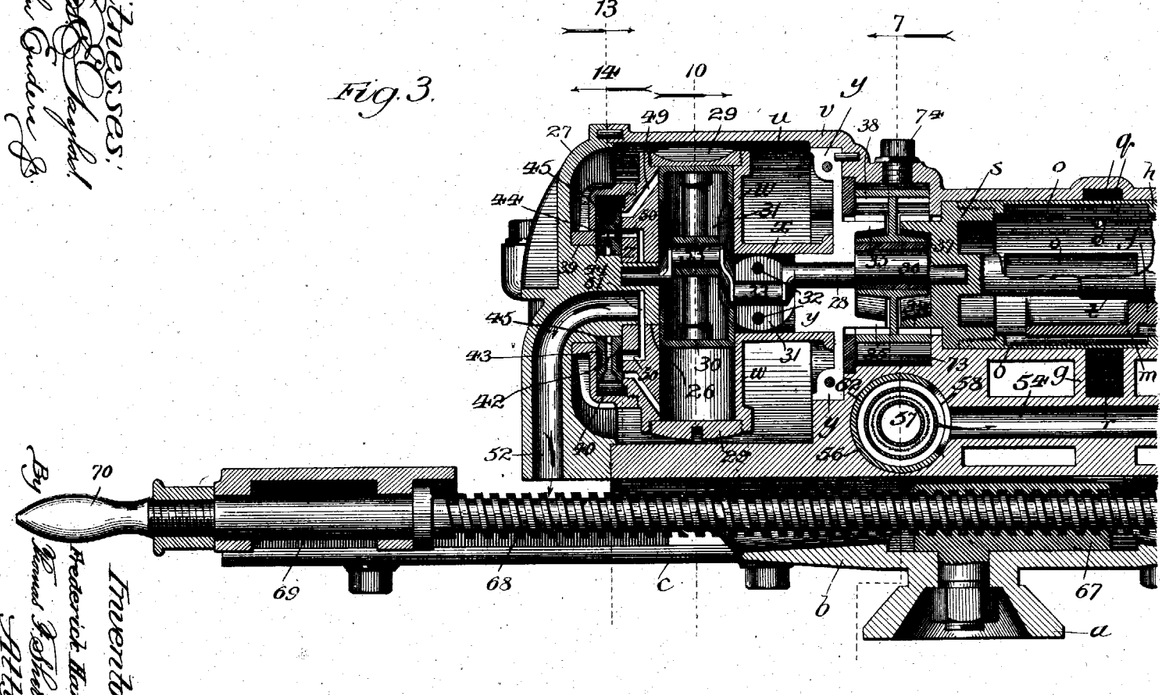
Fig. 3 an enlarged longitudinal section of a portion of the machine, taken on line 3 of Fig. 1 and embracing so much of the machine as is inclosed by the bracket 3 of Fig. 2.
Figure 5:
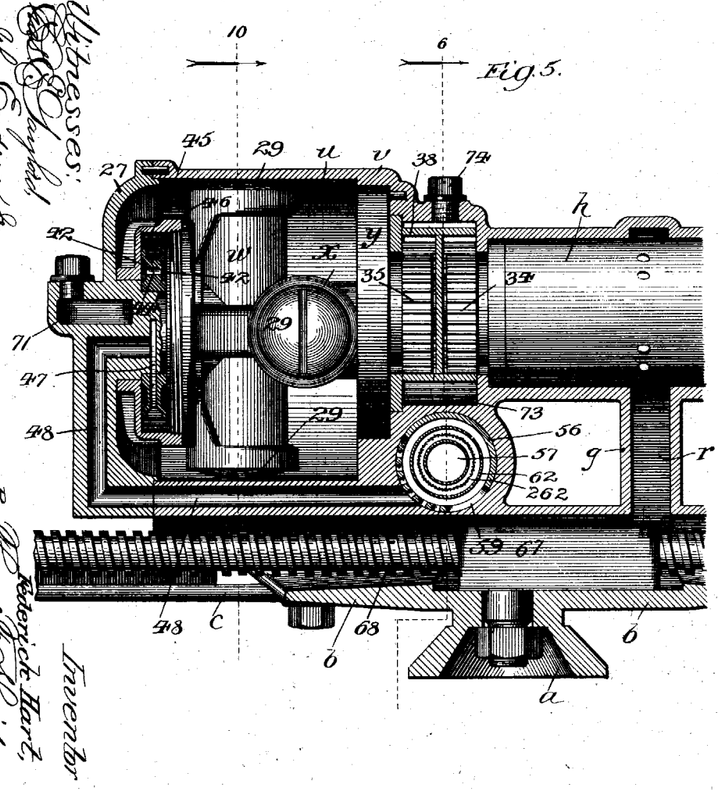
Fig. 5 a sectional elevation of a portion of the machine, embracing about the same mechanisms as are shown in Fig. 3, but with the hammer cylinder, gears and engine casing in full line.
Figures 15, 16, 17, 18, 19, 20:
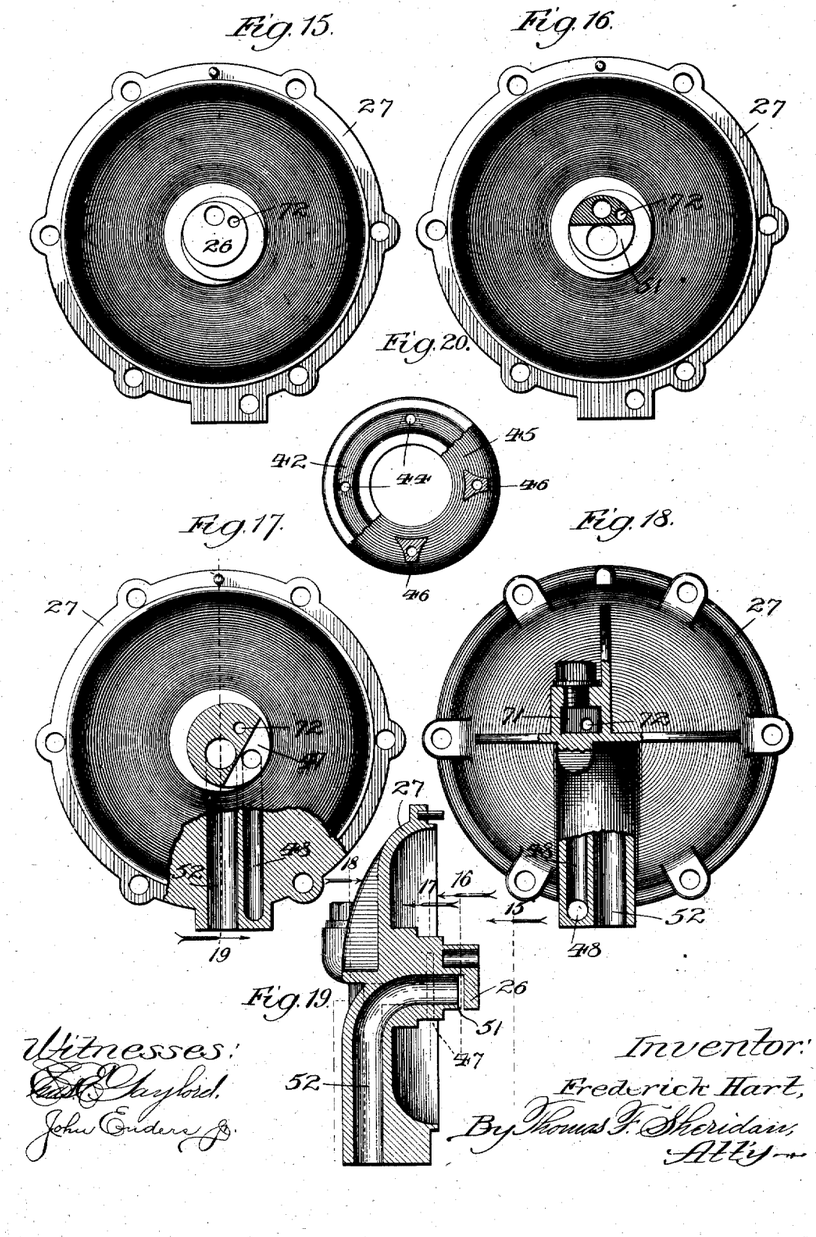
Fig. 15 an elevation of the cap which closes the engine chamber, looking at it from the inside, which would be about line 14 of Fig. 13 and line 15 of Fig. 19 looking in the direction of the arrows, with all other mechanisms removed.
Fig. 16 a similar view, partly in section, taken on line 16 of Fig. 19.
Fig. 17 a similar view, taken on line 17 of Fig. 19.
Fig. 18 an elevation of the outer side of such cap, partly in section, taken on line 18 of Fig. 19 looking in the direction of the arrow.
Fig. 19 a longitudinal sectional elevation of the cap, taken on line 19 of Fig. 17 looking in the direction of the arrow.
Fig. 20 a plan view, partly in section, of the disk valve hereinafter described.
Figure 21:
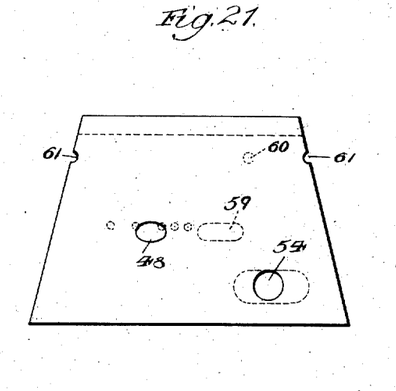
Fig. 21 a developed surface view of the chamber in which the tapered plug controlling or throttle valve operates.
Figure 22:
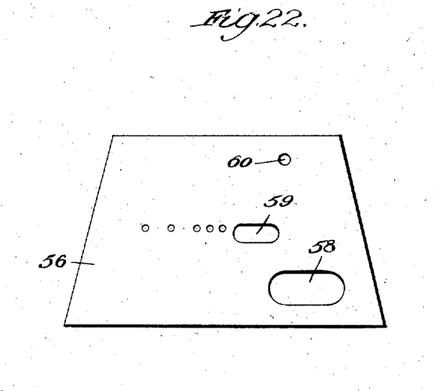
Fig. 22 a similar view of the outer surface of the valve itself, laid in a flat plane.

To transmit power and motion from the multiple inder fluid pressure engine to the hammer cylinder rear cap of such cylinder is provided with an wardly projecting spur gear 34; and the fixed parti *y* has a forwardly projecting non-rotatable spur ge having a lesser number of teeth by two than the 34—that is, the gear 34 has 34 teeth, while the ge has but 32 teeth, although this particular numb not essential, and, furthermore, the ratio of gea may be different from that shown, and may be chai in various ways, as will be readily apparent to t skilled in the art. For instance, in this syste gearing the two spur gears may have a different r ber of teeth, and the two internal gears may ha different number of teeth; or; as in the case in p the two internal gears may have the same numb teeth and the two spur gears a different number again, the two spur gears may be of the same nu of teeth and the two internal gears of a different r ber. By reversing the positions of gears 34 and 3 direction of the hammer cylinder would be chan In this instance I prefer to provide the inner pro ing end of the engine crank shaft with an eccentri upon which is loosely mounted a bushing 37 havir internal spur gear 38, in turn loosely mounted the This internal gear has more teeth than either o spur gears, and engages with both. Being loose the crank shaft as it rotates, the internal gear enç with the fixed gear and, rotating upon the same, d the rotatable hammer cylinder with its gear befc in proportion to the number of teeth in all of gears. It will also be seen that as the engine cyli rotate, the crank shaft is turned twice for every tion of the cylinders—once for the rotation of the inders, and once by the thrusts of the movable pis In this form of engine there are three members, one of which may be held firm, but the other two be allowed to rotate. The three members are th gine cylinders, the crank, and the trunnion on w the engine cylinders rotate. The engine cylinders be held fast and the crank and the trunnions all to rotate; or the crank may be held fast and the is and cylinders allowed to rotate; or, as I prefer have here shown and described, the trunnions may .eld fast and the engine and crank allowed to rotate. o furnish fluid pressure to and exhaust it from the mbers of the cylinders of the multiple fluid pressure ine, a valve cap 39 is provided and secured to the re face z of the engine, in such manner as to provide lve chamber 40. In this valve chamber is arranged .nnular valve 41, which has a circular groove or ex- st port 42 on the inner face thereof, which groove is nected with a similar groove 43 on the other face of valve, by means of a plurality of perforations 44, in r to balance such valve. The valve is further pro- d with a transverse or radial slot or groove 45, which tantially divides the valve into two parts, con- ;ed only by pillars 46, through which the perfora- s 44 extend. This dividing slot, or as I will here- r term it "radial slot" 45, forms the inlet passage ugh such valve and registers at all times with a slot see Figs. 19 and 5—in the bearing portion of the cap /hich connects with the main inlet passage 48 and nds through such cap and the engine frame, so that .ll times—when the throttle valve is open—fluid sure will be admitted to the valve chamber. The ne is in turn provided with passages or ports 49, one ach end of its cylinder portions, which form alter- ly inlet and outlet ports. These inlet ports, as I will convenience term them, lead outwardly from the nder chambers and towards the center of the valve of the engine, as shown in Fig. 3. The exhaust ports nd through the walls of the engine inside of the named passages and in position to register with a 51—see Fig. 19—which, in turn, connects with the n exhaust passage 52 in the cap 27. During the ro- n of the engine, as shown somewhat in Fig. 3, the ve or exhaust port 42 on the inner face of the disk re connects the passages 49 and 51 together, thereby pleting the exhaust channel, so that any fluid un- pressure in the engine cylinder may be exhausted 1 each of the cylinders successively and as the en- cylinders rotate.

he supply passage 48, which leads to the multiple nder fluid pressure engine and the supply passage 54 ch leads to the hammer cylinder, both enter the ro- ble chamber, so that they may be controlled by one ttle valve—all of which will be understood by those ed in the art. It is desirable to have a throttle re of such construction and arrangement that it will it fluid under pressure as desired. To accomplish , a tapered plug throttle valve 56 is provided and tably mounted in the supporting plate—as I choose rm it—having a main or longitudinal tubular open- 7 therein, and radial openings 58, 59 and 60 extend- through its side walls and also having a tube 62 be- n the outer wall of the valve and the wall of such itudinal opening 57. The opening 58 connects the a opening in the valve with the supply passage 54 leads to the hammer cylinder. The opening or ings 59 connect the main passage in the valve with passage 48 that leads to the fluid pressure engine. passage is a by-pass, which is opened before. er one of the openings 58 and 59 connect with their ective passages, so that any dirt or dust in the valve blow through an opening 61 in the frame of the ma- e. The passages 59 are of varying size—that is, the left-hand or initial end of the same are of smaller diam- eter, as shown in Fig. 22, so that when they first connect with the passage 48 they admit the minimum amount of pressure thereto and rotate the fluid pressure engine slowly at first. When the right hand passage is registering with 48, then the maximum amount of motive fluid is admitted to the fluid pressure engine to rotate the same at its maximum velocity. As shown in Fig. 21, the valve is about to increase speed of engine, and the hammer is already at its maximum. The action of the throttle valve is as follows: First, it opens engine port just sufficiently to turn the engine; second, it turns the hammer and brings it to full speed; third, it increases the speed of the engine to its maximum (hammer re- maining during this period at full speed); fourth, it stops the hammer; fifth, it stops the engine; and sixth, it blows out the dirt.

Figure 4:
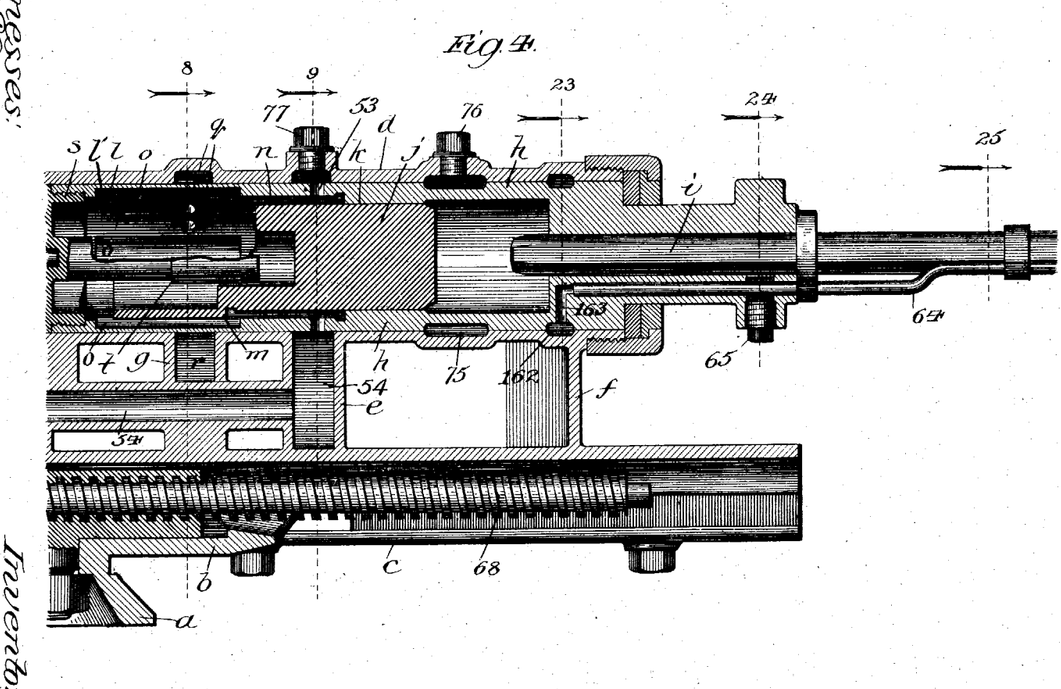
Fig. 4 a longitudinal sectional elevation of the front end of the machine, taken on line 4 of Fig. 1 and embracing as much of the machine as is inclosed by bracket 4 of Fig. 2.
Figure 6:
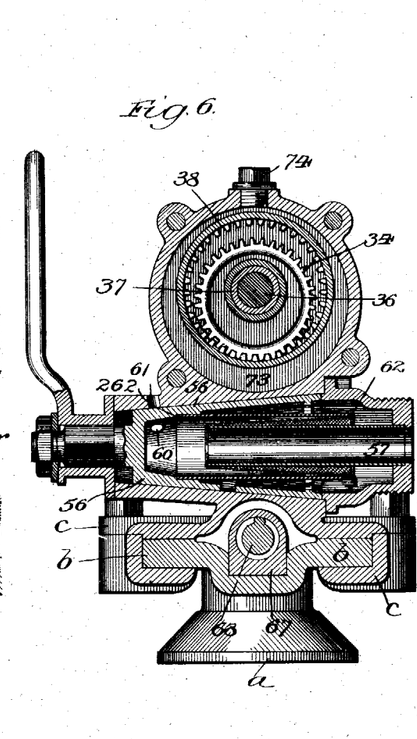
Fig. 6 a cross-sectional view, taken on line 6 of Fig. 5.
Figures 7, 8:
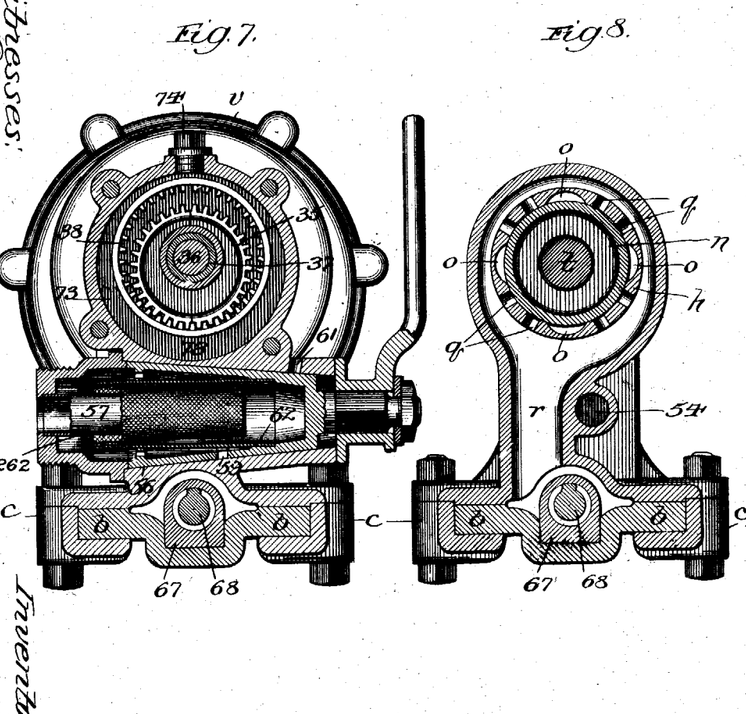
Fig. 7 a cross-sectional elevation, taken on line 7 of Fig. 3.
Fig. 8 a cross sectional elevation, taken on line 8 of Fig. 4.
Figure 9:
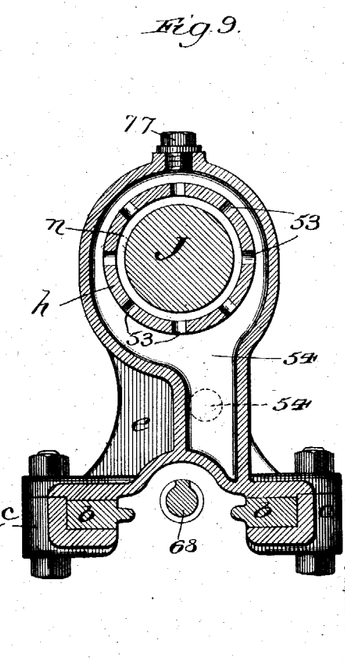
Fig. 9 a cross-sectional elevation, taken on line 9 of Fig. 4.
Figure 10:
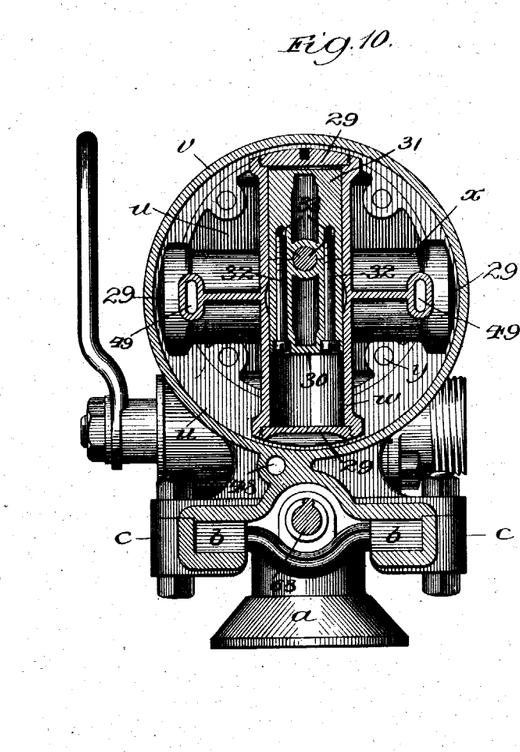
Fig. 10 a cross sectional elevation, taken on line 10 of Figs. 3 and 5.
Figure 11:
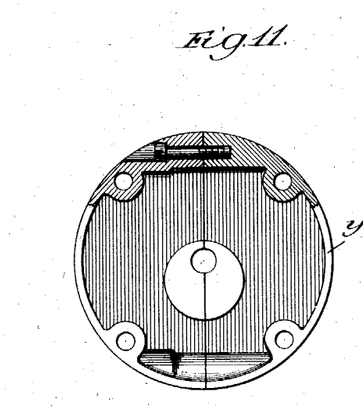
Fig. 11 a detail of the fixed partition, which carries one of the intermediate gears and which also forms a journal bearing for one end of the rotatable engine, removed from connection with the other mechanisms.
Figure 12:
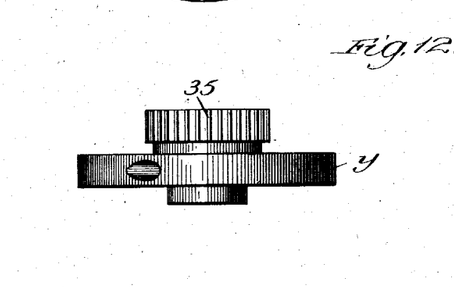
Fig. 12 a side elevation of the same.
Figure 13:
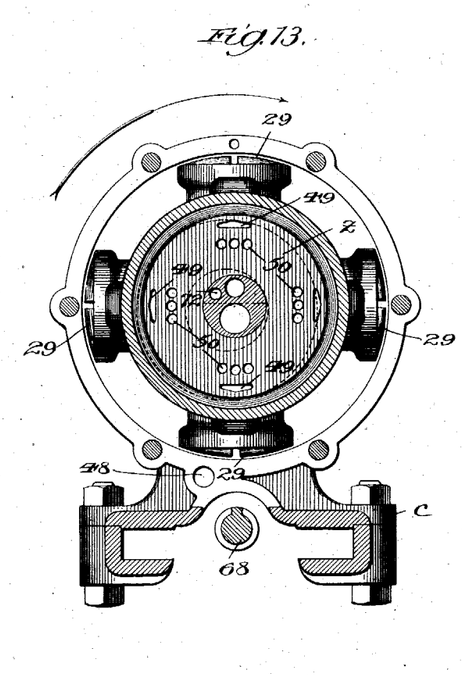
Fig. 13 a cross sectional view, taken on line 13 of Fig. 3 looking in the direction of the arrow.
Figure 14:
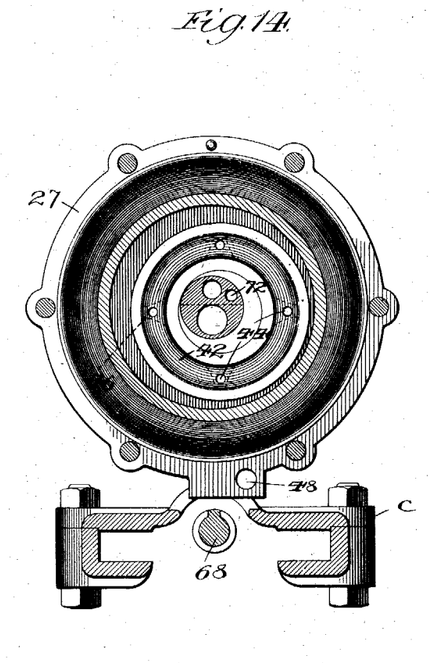
Fig. 14 a cross sectional view, taken on line 14 of Fig. 3 looking in the direction of the arrow—that is, in a direction opposite to the mechanism shown in Fig. 13.

To prevent dirt or dust from entering the machine, a second precaution is taken—that is, a screen 262 is mounted intermediate the ports 58 and 59 and the main passage of the valve, so that all dust or dirt will be apt to remain in the valve and not pass through the machine. This screen is formed of reticulated metal, preferably of wire netting, as shown, and is mounted intermediate the tube 62 and the wall of the passage or longitudinal opening 57 of the valve 56, as shown in Figs. 4, 6, and 7. As above stated, the dust remaining in the valve will be blown out after the passages 48 and 54 are closed through the passages 60 and 61, and again before such passages are opened—all of which will be appreciated by those skilled in the art.

Figures 23, 24, 25:
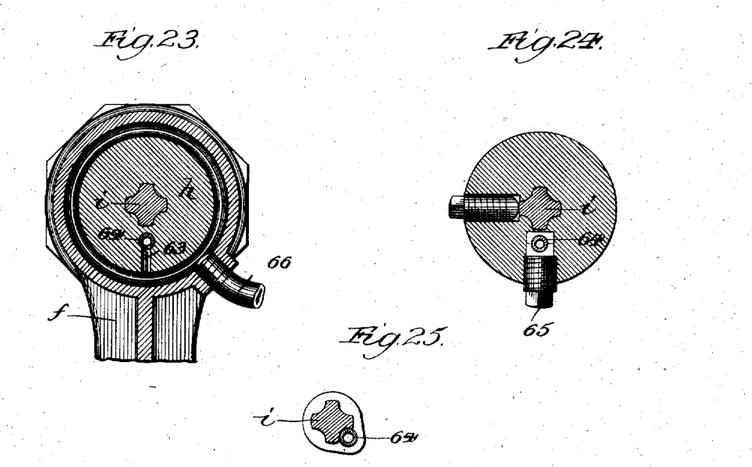
Fig. 23 a cross-sectional view, taken on line 23 of Fig. 4.
Fig. 24 a cross sectional view, taken on line 24 of Fig. 4.
Fig. 25 a cross sectional view, taken on line 25 of Fig. 4.

It is desirable, and oftentimes necessary, to provide the working end of the drill with water; and in order to accomplish this in as economical a manner as possi- ble, I provide an annular water channel 162 between the hammer cylinder and its tubular supporting por- tion, and the front end of the hammer cylinder with a longitudinal passage 163, in which is mounted a water pipe 64, held in place by means of a set screw 65. This water channel is connected with a source of water supply by means of a tube 66, shown particularly in Fig. 23. By this, it will be seen that the hammer cylin- der may be rotated at all times, so as not to interfere with the supply of water to the pipe 64.

To feed the supporting frame forward on its turret base, such base is provided with a threaded nut 67, and the supporting frame with a feed screw 68, journaled therein at 69 in the usual manner and provided with an operating handle 70.

In order to oil the machine economically and in as few places as possible to enable it to work as long as possible, the cap of the machine is provided with an oil chamber 71, which has an oil passage 72 leading therefrom through the bearing portion of such cap and into the end of the same, and consequently into the first fluid pressure cylinder in the engine. As much oil as is necessary may be admitted into this cylinder, which opens into the second cylinder at the central portion thereof, on account of the single-acting pistons being hollow, or of the usual trunk shape. The oil in such cylinders will serve not only to lubricate the pis- tons and cylinders, but also the crank shafts and bear- ings therefor. It will also lubricate the outer rotatable bearing of the engine frame and flow from therein with the air pressure out into the valve chamber to lubricate it and its movable bearings. A supply of oil may be kept in this chamber that will suffice to run the machine from two to three days, and sometimes even a week, as has been determined by actual experiments. The intermediate internal gear rotates in a gear chamber 73, which chamber is considerably larger than the gear and has an opening extending out to the outer surface of the machine frame closed by an oil screw 74, so that oil may be forced into this chamber to lubricate the gears and mountings therefor and the inner end of the hammer cylinder. The hammer cylinder is provided with an oil channel 75 at the front part, access to which may be had by means of an oil screw 76, which further serves to lubricate the hammer cylinder. Oil may be supplied to the interior of the hammer cylinder by removing an oil screw 77—which permits it to enter through the air supply openings, as shown particularly in Fig. 4—so that these four points are all that is necessary to lubricate the entire machine and furnish a supply of oil that will last a considerable time—all of which will be understood and appreciated by those skilled in the art.

I claim:

1. In mechanisms of the class described, the combination of a rotatable cylinder provided with an opening to receive the shank of a drill or similar tool, a percussion hammer therein, a multiple cylinder fluid pressure engine at the rear of the hammer cylinder the crank shaft of said engine being in axial alinement with said rotatable cylinder, and the cylinders of said engine being symmetrically disposed about said crank shaft, and gear mechanism connecting the multiple cylinder fluid pressure engine and the hammer cylinder to transmit power and motion from the engine to the hammer cylinder, substantially as described.

2. In mechanisms of the class described, the combination of a supporting frame portion, a hammer cylinder rotatably mounted therein and provided with an opening in the front end to receive the shank of a drill or similar tool, a percussion hammer therein, a multiple cylinder fluid pressure engine arranged at the rear of the hammer cylinder, the crank shaft of said engine being in axial alinement with said hammer cylinder, and the cylinders of said engine being symmetrically disposed about said crank shaft, and compound gearing interposed between the fluid pressure engine and the hammer cylinder to transmit power and motion from such engine to such hammer cylinder, substantially as described.

3. In mechanisms of the class described, the combination of a supporting frame portion, a hammer cylinder rotatably mounted therein, the front end of which is provided with an axial opening to receive a drill or similar tool, a percussion hammer in the hammer cylinder, a multiple cylinder fluid pressure engine arranged at the rear of the hammer cylinder and substantially in line with the hammer cylinder, a gear on such hammer cylinder, a second gear fixed to the frame portion, and an intermediate gear engaging with both of such gears and with the fluid pressure engine to transmit power and motion from such fluid pressure engine to the hammer cylinder, substantially as described.

4. In mechanisms of the class described, the combination of a supporting frame portion, a hammer cylinder rotatatably mounted therein having an axial opening at the forward end thereof to receive the shank of a drill or similar tool, a percussion hammer mounted in such hammer cylinder, a cap closing the rear end of such cylinder and provided with an integral spur gear projecting therefrom, a multiple cylinder fluid pressure engine arranged in the rear of the hammer cylinder and substantially in line therewith, a second gear fixed to the frame of the machine, and an intermediate gear engaging with the gear on the cap of the hammer cylinder and the fixed gear and with the multiple cylinder fluid engine to transmit power and motion from such engine to the hammer cylinder, substantially as described.

5. In mechanisms of the class described, the combination of a supporting frame, a hammer cylinder rotatably mounted therein and provided with an axial opening a the front end to receive the shank of a drill or simila tool, a percussion hammer in such cylinder, a cap in er gagement with the rear end of the hammer cylinder an provided with a spur gear on its outer end, a multipl cylinder fluid pressure engine arranged at the rear of th hammer cylinder and substantially in line therewith, second spur gear fixed to the frame of the machine in axi alinement with the spur gear on the end of the hamme cylinder and bearing a different number of teeth than th gear on the hammer cylinder, and an intermediate gea engaging with both of such gears and with the multipl cylinder fluid pressure engine to transmit power and m< tion therefrom to the hammer cylinder, substantially a described.

6. In mechanisms of the class described, the combina tion of a supporting frame portion, a hammer cylinder r< tatably mounted therein provided with an axial opening t receive the shank of a drill or similar tool, a percussio hammer therein, a spur gear mounted on the rear end c the hammer cylinder, a multiple cylinder fluid pressur engine at the rear of the hammer cylinder and substar tially in line therewith, a second gear fixed to the frame c the machine, and an internal gear engaging both of suc gears and the fluid pressure engine for transmitting pow< and rotary motion therefrom to the hammer cylinder, su stantially as described.

7. In mechanisms of the class described, the combina tion of a supporting frame, a hammer cylinder rotatabl mounted therein and provided with an axial opening i the front end to receive the shank of a drill or simila tool, a percussion hammer in such cylinder, a cap closin the end of such hammer cylinder and provided with a pr< jecting spur gear, a multiple cylinder fluid pressure engir arranged at the rear of the hammer cylinder and substar tially in line therewith, a second gear fixed to the fram of the machine between the multiple cylinder fluid pre sure engine and the gear on the hammer cylinder, and a internal gear engaging with both of such gears and wit the fluid pressure engine to transmit power and motio therefrom to the hammer cylinder, substantially as d scribed.

8. In mechanisms of the class described, the combina tion of a supporting frame, a hammer cylinder rotatabl mounted therein provided with an axial opening at or end thereof to receive the shank of a drill or similar too a percussion hammer in such cylinder, a gear secured 1 and projecting from the rear end of the hammer cylinde a multiple cylinder fluid pressure engine mounted to the re< of the hammer cylinder and substantially in line ther with, a crank or similar shaft projecting from such engir towards the hammer cylinder having an eccentric on i projecting end, a second spur gear fixed to the frame < the machine between the fluid pressure engine and tl hammer cylinder, and an intermediate internal ge< loosely mounted upon an eccentric of the engine shaft e< gaging both of the above named gears to transmit pow< and rotary motion from the engine to the hammer cylinde substantially as described.

9. In mechanisms of the class described, the combina tion of a supporting frame portion, a hammer cylinder r< tatably mounted therein and provided with an axial oper ing at its front end to receive the shank of a drill or sim lar tool, a percussion hammer mounted therein, a spt gear secured to and projecting from the rear end of tl hammer cylinder, a multiple cylinder fluid pressure engir rotatably mounted at the rear end of the hammer cylind< and substantially in line therewith, a crank shaft in suc engine projecting inwardly therefrom, a second spur ge< of a different number of teeth secured to the frame of tl machine intermediate the fluid pressure engine and tl first named spur gear, and an intermediate internal spt gear loosely mounted on the crank shaft of the engine an engaging both the above named gears to transmit pow< and motion from the engine to the hammer cylinder, su stantially as described.

10. In mechanisms of the class described, the combin< tion of a supporting frame portion, a hammer cylind< rotatably mounted therein and provided with an axial opening in its front end to receive the shank of a drill or similar implement, a percussion hammer therein, a spur gear secured to and projecting from the rear end of the hammer cylinder, a multiple cylinder fluid pressure engine rotatably mounted in the frame of the rear of the hammer cylinder and substantially in line therewith, a crank shaft for such fluid pressure engine extending inwardly therefrom and provided with an eccentric portion, a second spur gear containing a lesser number of gear teeth than the first named gear fixed to the frame of the machine intermediate the fluid pressure engine and the hammer cylinder, and an intermediate internal gear mounted on the crank shaft and engaging both the spur gears to transmit power and motion from the engine to the hammer cylinder, substantially as described.

11. In mechanisms of the class described, the combination of a supporting frame portion provided with an engine chamber, a hammer cylinder rotatably mounted therein and provided with an axial opening at one end thereof to receive the shank of a drill or similar tool, a gear secured to and projecting from the rear end of such hammer cylinder, a percussion hammer in such cylinder, a multiple cylinder fluid pressure engine rotatably mounted in the engine chamber of the supporting frame to the rear of the hammer cylinder, a crank shaft on such hammer cylinder extending inwardly therefrom having its inner end journaled in the end of the hammer cylinder and provided with an eccentric portion between such cylinder and the engine, a second spur gear containing a different number of teeth than the first named spur gear arranged between the fluid pressure engine and the hammer cylinder, and an internal gear loosely mounted on the eccentric of the engine crank shaft and engaging both the above named spur gears to transmit power and motion from such engine to the hammer cylinder, substantially as described.

12. In mechanisms of the class described, the combination of a supporting frame portion, a hammer cylinder rotatably mounted therein and provided with an axial opening in its front end to receive the shank of a drill or similar tool, a percussion hammer in such cylinder, a spur gear secured thereto, a multiple cylinder fluid pressure engine, the casing of which is rotatably mounted in the frame of the machine comprising two cylinders mounted in different planes and at an angle to each other, pistons in such portions, a crank shaft provided with two cranks engaging the pistons in the cylindrical portions, one portion of which extends inwardly from the fluid pressure engine towards the hammer cylinder, and intermediate gear mechanism connecting the crank shaft with the spur gear on the hammer cylinder to transmit power and motion therefrom, substantially as described.

13. In mechanisms of the class described, the combination of a supporting frame portion, a hammer cylinder rotatably mounted therein and provided with an axial opening in its front end to receive the shank of a drill or similar tool, a percussion hammer in such cylinder, a spur gear secured thereto, a multiple cylinder fluid pressure engine casing rotatably mounted in the frame of the machine comprising two cylinders mounted in different vertical planes and at an angle to each other, pistons in such cylinder portions, a crank shaft provided with double cranks engaging such pistons the outer ends thereof rotatably mounted in the frame of the machine with one end extending inwardly and provided with an eccentric portion, and gear mechanism mounted upon the eccentric on the inner end of the crank shaft engaging with the spur gear on the hammer cylinder to rotate the same, substantially as described.

14. In mechanisms of the class described, the combination of a supporting frame portion, a hammer cylinder rotatably mounted therein provided with an axial opening in one end to receive the shank of a drill or similar tool, a percussion hammer in such cylinder, a spur gear secured to the inner end thereof and projecting therefrom, a multiple cylinder fluid pressure engine rotatably mounted in the frame of the machine to the rear of the hammer cylinder having two cylinder portions arranged in different vertical planes and at an angle to each other, a double crank shaft for such engine, two single-acting pistons in each of such portions secured together at the point where their bearings engage the cranks on the crank shaft, and gear mechanism engaging with the spur gear on the hammer cylinder and with the crank shaft of the fluid pressure engine to transmit power and motion therefrom to such hammer cylinder, substantially as described.

15. In mechanisms of the class described, the combination of a supporting frame portion, a hammer cylinder rotatably mounted in the frame portion, a percussion hammer mounted therein, a spur gear secured to and projecting from the rear end of the hammer cylinder, a multiple cylinder fluid pressure engine rotatably mounted in the frame of the machine to the rear of the hammer cylinder and substantially in line therewith having two cylinders arranged in different vertical planes and substantially at right angles to each other, a double crank shaft rotatably mounted in the frame of the machine, two single acting pistons in each of the cylinders secured together where their bearings engage with the cranks of the crank shaft, an eccentric on the inner end of the crank shaft, a second spur gear of different number of teeth than the first named spur gear secured to the frame of the machine between the fluid pressure engine and the hammer cylinder, and an internal gear loosely mounted on the eccentric of the crank shaft and engaging both of the gears to transmit power and motion from the engine to the hammer cylinder, substantially as described.

16. In mechanisms of the class described, the combination of a supporting frame portion, a hammer cylinder rotatably mounted in such frame portion and provided with an axial opening in the front end thereof to receive the shank of a drill or similar tool, a spur gear secured to and projecting from the rear end of the hammer cylinder, a percussion hammer in such cylinder, a multiple cylinder fluid pressure engine rotatably mounted in the frame of the machine to the rear of the hammer cylinder and substantially in line therewith having two cylinder portions arranged in different vertical planes and substantially at right angles to each other, a double crank shaft for such engine rotatably mounted in the frame of the machine and with its inner end in rotary engagement with the rear end of the hammer cylinder, an eccentric on such crank shaft adjacent to the rear end of the hammer cylinder, two single acting pistons in each of such cylinder portions of the fluid pressure engine secured together at the point where they form bearings for the cranks of the crank shaft, a second spur gear of lesser number of teeth than the first named spur gear secured to the frame of the machine intermediate the fluid pressure engine and the hammer cylinder, an internal gear loosely mounted on the crank shaft and engaging both of the first named gears to transmit power and motion from the engine to the hammer cylinder, substantially as described.

17. In mechanisms of the class described, the combination of a supporting frame provided with an engine chamber at its rear portion, a hammer cylinder rotatably mounted therein and provided with an axial opening in the front end thereof to receive the shank of a drill or similar tool, a percussion hammer in such cylinder, a multiple cylinder fluid pressure engine rotatably mounted in the engine chamber of the frame portion, gear mechanism engaging with such engine and with the hammer cylinder to transmit power and motion from the engine to the cylinder, a removable cap on such supporting frame which closes the engine chamber and on which one journal of the fluid pressure engine is rotatably mounted, provided with fluid pressure supply and exhaust channels for such engine, and means for cutting off and supplying fluid pressure to the supply channel of such cap, substantially as described.

18. In mechanisms of the class described, the combination of a supporting frame provided with an engine chamber at its rear portion, a hammer cylinder rotatably mounted therein provided with an axial opening in the front end thereof to receive the shank of a drill or similar tool, a multiple cylinder fluid pressure engine rotatably mounted in the engine chamber in the frame of the machine to the rear of the hammer cylinder, a cap removably secured to the end of the frame of the machine and closing the engine chamber and forming a bearing for one journal of the fluid pressure engine and provided with supply and exhaust ports for the motive fluid of such fluid pressure engine, a crank shaft having one end journaled in the removable cap and the other end in the frame of the machine and hammer cylinder, and gear mechanism engaging with the hammer cylinder and crank shaft to transmit power and motion from the engine to the cylinder, substantially as described.

19. In mechanisms of the class described, the combination of a supporting frame portion, a hammer cylinder rotatably mounted therein and provided with an axial opening in the front end thereof to receive the shank of a drill or similar tool, a percussion hammer in such cylinder, a multiple cylinder fluid pressure engine rotatably mounted in the frame of the machine for rotating the hammer cylinder comprising two tubular cylinders mounted in different vertical planes and at an angle to each other, a double crank shaft for such engine journaled in the supporting frame, two single acting pistons in each of such tubular cylinder portions secured together at the point where they form the bearings for the cranks of the crank shaft, a port or passage at the outer end of each tubular cylinder acting alternately as supply and exhaust ports, a cap secured to one face of the engine casing and providing a valve chamber between it and the engine casing, a disk valve rotatably mounted therein provided with a groove on its inner face, and exhaust ports passing through the engine casing and through the frame of the machine and arranged to be connected by the groove on the inner face of the disk valve, whereby as the engine is rotated the valve connects and disconnects in succession the ports and passages to provide for the inlet and exhaust of the motive fluid, substantially as described.

20. In mechanisms of the class described, the combination of a supporting frame portion, a hammer cylinder rotatably mounted therein provided with an axial opening in the front portion to receive the shank of a drill or similar tool, a multiple cylinder fluid pressure engine rotatably mounted in the frame of the machine comprising two cylinder portions arranged in different planes and at an angle to each other, a double crank shaft for such engine rotatably mounted in the frame of the machine, two single acting pistons in each of the cylinder portions secured together at a point where they form the bearings for and engage with the crank shaft, a port or passage at the outer ends of each cylinder acting alternately as supply and exhaust ports, exhaust ports disconnected from the first named ports inside of the same and extending through the engine casing and connecting with the main exhaust port in the frame of the machine, a disk valve, the axis of which is eccentric to the axis of the multiple cylinder fluid pressure engine provided with a groove on the inner face thereof which connects and disconnects the ports and passages to complete the exhaust passages, the outer peripheral edge of which disk cuts off and opens the inlet ports successively, and a cap secured to the engine frame and closing the disk valve to form the valve chamber, substantially as described.

21. In mechanisms of the class described, the combination of a supporting frame portion, a hammer cylinder rotatably mounted therein and provided with an axial opening in the front end to receive the shank of a drill or similar tool, a percussion hammer in such cylinder, a multiple cylinder fluid pressure engine rotatably mounted in the frame of the machine for rotating the hammer cylinder comprising two cylinders mounted in different vertical planes and substantially at right angles to each other and having a valve face, a double crank shaft for such engine rotatably mounted in the frame of the machine, piston mechanism in such cylinder portions engaging with the crank of the double crank shaft, a port or passage at each end of each cylinder alternately acting as an exhaust and inlet port and opening to the valve face of the engine, exhaust ports independent of the first named ports extending through a portion of the engine casing and inside of such first named ports and connecting with a main exhaust port, a disk valve eccentrically mounted with regard to the axis of the engine and provided with a face groove arranged to connect the first named ports and passages successively to complete the exhaust channels, a radial slot through which the motive fluid is admitted to the valve chamber, the inner peripheral edge of the disk valve cutting off and opening the inlet ports of the engine successively, and a cap secured to the outer face of the disk valve to form the valve chamber, substantially as described.

22. In a machine of the class described, the combination of a supporting frame portion, a hammer cylinder rotatably mounted therein and provided with an axial opening in the front end to receive the shank of a drill or similar tool, a percussion hammer in such cylinder, a multiple cylinder fluid pressure engine rotatably mounted in the frame for rotating the hammer cylinder comprising two cylinders mounted in different vertical planes and substantially at right angles to each other and provided with a valve face, a double crank shaft for such engine, piston mechanism in such cylinders, ports or passages in the engine frame—one for each end of each cylinder portion leading to the valve face thereof and forming alternately inlet and exhaust ports, a second set of passages extending through such engine frame in the same face and inside of the first named ports or passages to form continuations of the exhaust ports and connected with a main exhaust port in the supporting frame, a cap secured to the valve face of the engine frame forming a valve chamber in connection with such face, a cap portion secured to the frame of the machine extending outside of the multiple cylinder fluid pressure cylinder and having a journal portion extending inwardly therefrom upon which the fluid pressure engine is rotatably mounted and provided with main inlet and exhaust ports for the motive fluid, both of which passages extend through the bearing portions upon which the engine casing is mounted, a disk valve mounted in the valve chamber upon the cap journal and eccentric to the axis of the fluid pressure engine and provided with an inner circular groove which connects the ports and passages in the engine casing to complete the exhaust and with a peripheral groove having a radial slot extending inwardly therefrom to connect with the main inlet or supply passage for the admission of motive fluid to the valve chamber, the peripheral edge of the disk valve being arranged to cut off and open the inlet passages successively as the engine casing rotates to admit and cut off motive fluid supply, substantially as described.

23. In mechanisms of the class described, the combination of a supporting frame portion, a hammer cylinder rotatably mounted therein and provided with an axial opening in the front end to receive the shank of a drill or similar tool, a percussion hammer in such cylinder, a multiple cylinder fluid pressure engine for rotating such hammer cylinder, a main supply channel on the supporting frame for supplying air under pressure to the hammer cylinder and to the fluid pressure engine, a plug valve in such channel provided with an axial inlet and peripheral outlets for connecting the source of air supply with the hammer cylinder and the fluid pressure engine, a screen interposed between the main opening of such valve and the openings to the hammer cylinder and fluid pressure engine, and a by-pass in such valve outside of such screen and arranged to be opened before the other openings are opened and after they are closed to permit the dirt and foreign matter therein to blow out of the valve, substantially as described.

24. In mechanisms of the class described, the combination of a supporting frame portion, a hammer cylinder rotatably mounted therein provided with an axial opening in the front end to receive the shank of a drill or similar tool, a percussion hammer in such hammer cylinder, a multiple cylinder fluid pressure engine for rotating such hammer cylinder, a single supply opening in the supporting frame provided with branch passages running to the hammer cylinder and the fluid pressure engine, a plug valve arranged in the supporting frame at the single supply opening to intercept the above channels and open and close the same, such valve having two passages therethrough—one of uniform size throughout to open the passage to the hammer cylinder and the other of varying size dmit a small amount of pressure at first to the fluid sure engine and finally to the maximum amount, subtially as described.

i. In mechanisms of the class described, the combina- of a supporting frame portion, a hammer cylinder tably mounted therein and provided with an axial ing to receive the shank of a drill or similar tool, a nd opening parallel with the first named axial open to receive a water tube and extending outwardly to exterior cylindrical surface of the hammer cylinder, an annular water channel formed between the hammer ider and the supporting frame and connecting with channel of the water tube and provided with an inlet ing to receive a supply pipe or similar element so as irnish water when desired to the drill or similar tool, tantially as described.

i. In mechanisms of the class described, the combina- of a swiveling base portion, a supporting frame por- having a saddle slidingly mounted on such base por- a tubular portion connected with such frame saddle leans of a plurality of pillars, a casing providing an ne chamber at the rear end of such tubular portion ected integrally with the saddle frame, a hammer cyl- r rotatably mounted in the tubular portion of the sup- ing frame and provided with an axial opening in the t end thereof to receive the shank of a drill or similar a multiple cylinder fluid pressure engine rotatably nted in the engine chamber at the rear of the tubular ion and connected with the hammer cylinder for ro- ig the same, a removable cap portion secured to the of the casing to completely close the engine chamber in which the fluid engine rotates and form one journal bearing for such fluid pressure engine, and feed screw and nut mechanism connecting the saddle and swiveling base together to feed the mechanisms forward, substantially as described.

27. In mechanisms of the class described, the combination of a hammer cylinder having an axial bore of large and small diameters, the large diameter being arranged at or near the rear portion of such cylinder, a set of inlet passages at or near the front of the large bore in the hammer cylinder and a set of passages to the rear of the inlet passages, being all of the inlet and exhaust passages in such cylinder, by-passes in such hammer cylinder in the large bore thereof arranged longitudinally between the exhaust passages to permit air to pass around the same to the rear of the cylinder, a percussion hammer in such hammer cylinder formed of large and small diameters, the small diameter being the hammer portion and in front and the large diameter at the rear to furnish a larger superficial area and also to open and cut off the exhaust, a stepped bore in the rear of such hammer cylinder, and a cap secured to the rear of the hammer cylinder and provided with a plunger arranged to enter the smaller bore of the percussion hammer when such hammer reaches its rear limit of motion to cushion the same and prevent jar or shock, substantially as described.

FREDERICK HART.

Witnesses:
G. H. SHERMAN,
F. H. M. HART.